United States Patent [19]

Baeuerle et al.

[11] Patent Number: 5,438,246
[45] Date of Patent: Aug. 1, 1995

[54] METHOD FOR THE ADJUSTMENT OF A DISK CAM

[75] Inventors: Ralph Baeuerle, Berlin, Germany; Dietmar Kottwitz, Singapore, Singapore

[73] Assignee: Siemens Nixdorf Informationssysteme AG, Paderborn, Germany

[21] Appl. No.: 120,592

[22] Filed: Sep. 13, 1993

[30] Foreign Application Priority Data

Sep. 14, 1992 [EP] European Pat. Off. ............ 92115688

[51] Int. Cl.⁶ .......................... B26D 5/06; B26D 5/16
[52] U.S. Cl. .................................. 318/638; 318/618; 318/652; 318/671; 83/628
[58] Field of Search ............... 318/567, 599, 601, 612, 318/618, 626, 638, 640, 652, 671; 83/76.1, 620, 628, 917

[56] References Cited

U.S. PATENT DOCUMENTS 4,491,046  1/1985  Hosogaya .
4,570,113  2/1986  Linton et al. .
4,651,609  3/1987  Dobring et al. .
4,981,059  1/1991  Kobayashi .

FOREIGN PATENT DOCUMENTS 0191907     2/1989   European Pat. Off. .
2817209     9/1979   Germany .
62-254799  11/1987   Japan .
321233      6/1957   Switzerland .

*Primary Examiner*—Bentsu Ro
*Attorney, Agent, or Firm*—Hill, Steadman & Simpson

[57] ABSTRACT

A method for the adjustment of a disk cam, whereby an electric motor turns the disk cam out of a prescribed initial position by a prescribed rotational angle, comprising the steps of providing a disk cam having two markings in a prescribed angle from one another defining a target sector; sensing said two markings during the rotational motion of the disk cam by a sensor stationarily arranged outside the disk cam; in the initial position of the disk cam arranging the sensor having an angular spacing from a target radius of the target sector in rotational direction that is aligned to the rotational angle; identifying the running time of the passage of the markings at the sensor; and arresting the motor in response to the sensing of the second marking and supplying the motor with electrical energy for turning it in the opposite rotational sense, the amount of this energy dependent on the respectively identified running time, being taken from an energy/running time characteristic for the return of the disk cam to the initial position.

19 Claims, 6 Drawing Sheets

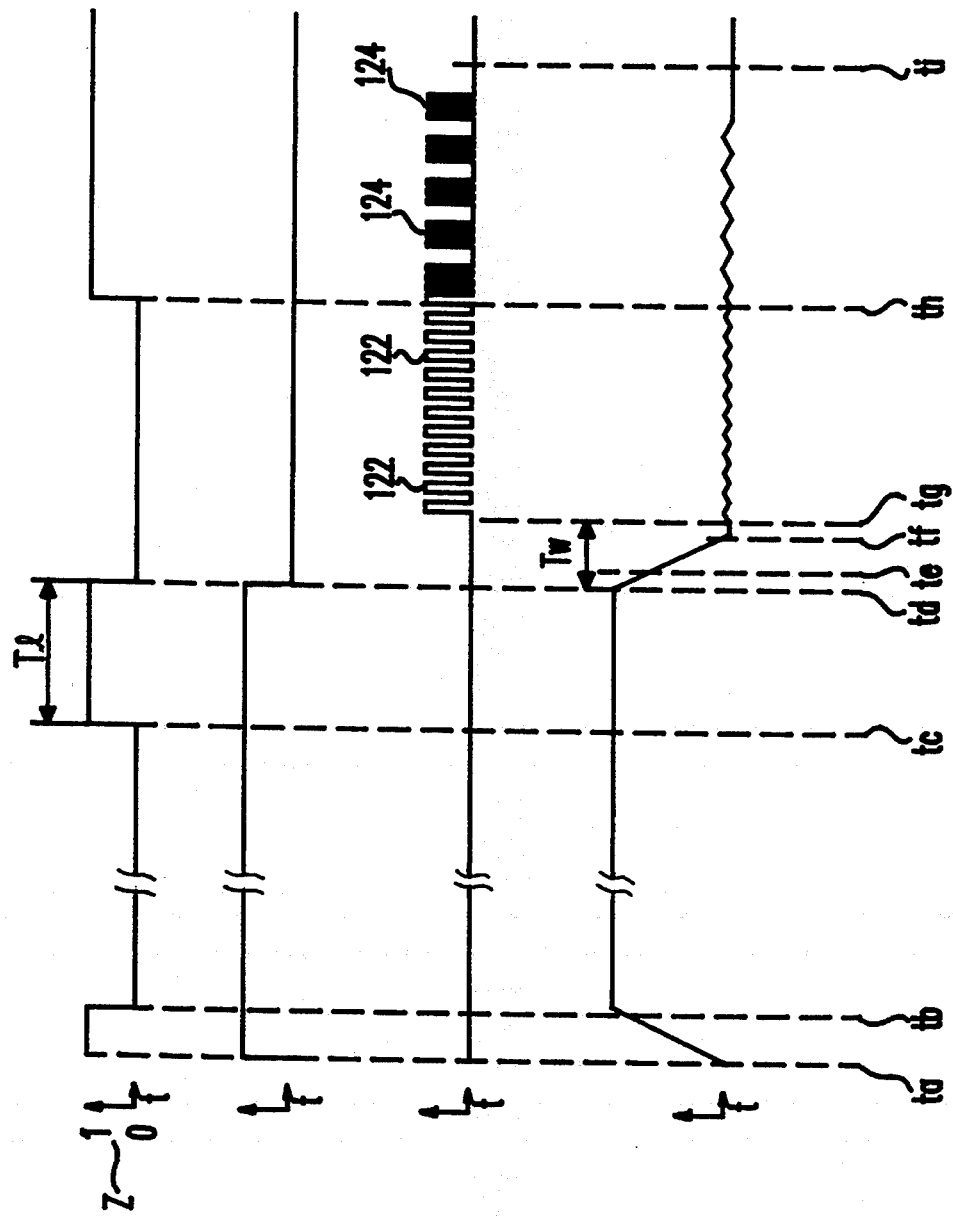

METHOD FOR THE ADJUSTMENT OF A DISK CAM

BACKGROUND OF THE INVENTION

The invention is directed to a method for the adjustment of a disk cam, particularly a link cam of a cutter means, whereby an electric motor turns the disk cam out of a preselected initial position by a prescribed rotational angle.

Such a method is employed, for example, for controlling a link cam that moves a knife of the cutter means. The stroke of the knife is varied dependent on the rotational angle and/or on the rotational direction. It thereby becomes possible to either partly or completely cut, for example, the register receipt in a cash register printer.

In a known method, a coding cam is arranged on the shaft of the motor and clock signals that respectively correspond to an angular change of the disk cam are generated with this coding cam. The clock signals are evaluated and the current rotational angle of the disk cam as well as the rotational direction thereof are identified. The motor is stopped when the prescribed rotational angle is reached. The application of this method requires a high mechanical and electronic outlay, since both the angular change as well as the rotational direction must be monitored.

SUMMARY OF THE INVENTION

An object of the invention is to provide a method for the adjustment of a disk cam that can be simply realized and nonetheless works precisely.

This object is achieved in a method wherein a disk cam has two markings defining a target sector at a prescribed rotational angle from one another which is preferably less than ninety-degrees, these markings being sensed by a stationary sensor arranged outside the disc cam, stationary with respect to the rotational motion of the disk cam. The sensor, in the initial position of the disk cam, has an operative angular spacing from a target radius within the target sector that is equal to the rotational angle of the disk cam. The running time of the passage of the markings past the sensor is identified. The motor is stopped in response to the sensing of the second marking and is supplied with electrical energy for rotation in the opposite rotational direction, the amount of this electrical energy being taken dependent on the respectively identified running time from an energy/running time characteristic for the return of the disk cam to the initial position, which for a 360° disk cam rotation, is the target position wherein the target radius resides opposite the sensor.

The adjustment of the disk cam to the initial position ensues at every rotation of the disk cam.

The angular speed of the disk cam is approximately constant after the run-up of the motor. The running time in a sector marked as target sector is measured for the rotational speed. All velocity influences such as, for example, the friction, the aging of the bearings, dirt on the bearing parts of the drive system, etc., are taken into consideration in this running time. When, after the target sector has moved past and the motor is arrested, the motor is subsequently turned in the opposite direction by being charged with an energy amount dependent on the previously identified running time. It is possible to bring the motor to a stand still within the target sector in a position that corresponds to the desired rotational angle.

Inventively, the amount of the energy is taken from an energy/running time characteristic. This characteristic has been previously calculated in measurement procedures with reference to systems composed of a disk cam and drive unit. For example, the energy/running time characteristic can be present in the form of a table or of a characteristic that is deposited in a memory of a microprocessor. In general, such a characteristic will exhibit a progressive behavior, i.e., the amount of the energy will also rise with lengthening running time.

Therefore, for a high angular velocity of the disk cam and, consequently, a short running time, the energy to be supplied to the motor after being arrested must be lower than for a low angular velocity and a correspondingly long running time. This relationship is to be attributed to the fact that the drive system exploits the supplied energy better given a high angular velocity, for example as a consequence of lower bearing friction, than given a low angular velocity given an input of energy that is otherwise the same. The amount of energy for moving the disk cam back to the desired rotational angle must then be correspondingly smaller. Conversely, the amount of energy must be increased when the running time lengthens.

Since all disturbances such as bearing wear and contamination are taken into consideration in the measured running time, the desired position is achieved with high precision and reliability. The precision that can be achieved is further enhanced in that the markings are attached directly to the disk cam.

A coding cam for imaging the current rotational angle is not required in the method of the invention. The involved evaluation of the clock signals generated with the coding cam is thus also eliminated. The method also takes deviations of the mechanical behavior of the system of motor/disk cam into consideration regarding the rotational speed as a consequence of manufacturing fluctuations. A system operating according to this method therefore need not be balanced after the installation. This is advantageous when the method is employed for systems that are mass-produced in high numbers.

In the method of the invention, the disk cam first turns beyond the target, i.e., the prescribed rotational angle, before it moves back into the desired target position. This motion sequence can be advantageous in numerous applications. Given, for example, the employment of the disk cam as a link cam for controlling a link block, it may be necessary to bring the disk cam into a defined initial position, to which end it must be briefly moved beyond its desired final position. In numerous other applications having a control-oriented character, as known, it is necessary to reach a target position only after a preceding over-shooting beyond this position. The invention is optimally suited for such applications.

Various types of markings can be employed for marking the target sector. For example, it is possible to utilize inductively or capacitatively acting markings and sensors that are respectively suitable for sensing such markings.

Optical markings that are sensed by an optical sensor are employed in a development of the invention. Such markings can be applied to the disk cam in an extremely simple way, for example with color, slots or holes. Suitable optical sensors can also be cost-beneficially obtained. Such sensors can be fashioned as a light barrier or as a reflex sensor and contain a radiation transmitter as well as a radiation receiver that interact in a known way and enable the sensing of markings.

Another development is characterized in that the motor—after being stopped and up to the renewed sensing of the most recently sensed marking—is turned with an energy feed that is constant over time.

On the basis of these measures, the disk cam is brought close to its target position in a controlled way and the static friction of the motor and of the disk cam taking effect after the motor has been arrested, does not factor into the result. Consequently, the target position is approached with even greater precision.

The afore-mentioned exemplary embodiment can be developed in that the energy share that is supplied to the motor for rotation in the opposite direction up to the renewed sensing of the most recently sensed marking is calculated and is taken into consideration in the energy/running time characteristic; and in that the amount of the energy still to be supplied to the motor increases with increasing energy share.

In addition to being dependent on the running time, the amount of energy to be supplied to the motor in this exemplary embodiment is also dependent on the energy share that had been supplied to the motor up to the renewed sensing of the most recently sensed marking. What these measures achieve is that changes in the mechanical behavior of the system composed of drive motor and disk cam, such as, for example, a change in the friction or the transmission behavior of the electromechanical drive or of the bearing plate, are compensated. When, for example, the friction of the bearing of the disk cam has increased due to abrasion, then moving the disk cam until the most recently sensed marking is reached requires an increased energy outlay that is reflected in said energy share. An even more precise approach of the target position within the target sector is enabled by the afore-mentioned measures.

A preferred development provides for the employment of a DC motor that is preferably supplied with current pulses after being arrested. This makes it possible to set the rotational speed of the disk cam by varying the duration, the pulse-to-pause ratio and the pulse frequency or a combination thereof. Further, the feed with current pulses can be realized in a technologically simple way with the assistance of digital electronics.

Another exemplary embodiment is characterized in that the motor is short-circuit decelerated for being arrested and/or after the delivery of the electrical energy. What this measure achieves is that the motor is quickly decelerated after departing the target sector and the distance from its target position thus become minimum. Moreover, after being supplied with the energy, the motor is held in a stable position in its target position by the holding moment of the short-circuited motor winding.

The afore-mentioned exemplary embodiment can be further developed in that the motor is short-circuited for a waiting time for being arrested after moving past the markings, this waiting time decreasing with increasing running time. As a result thereof, the time until being turned in the opposite direction to the target sector is minimalized, since the time for decelerating the motor is matched to the running time and, thus, to the angular velocity of the disk cam. When, for example, the running time is relatively long, this corresponding to a low angular velocity, then a short time can be adequate for deceleration until stand still of the motor. The waiting time can correspondingly be short, and the overall time for adjusting the disk cam is shortened.

An exemplary embodiment of the invention is set forth in greater detail below with reference to drawings.

BRIEF DESCRIPTION OF THE DRAWINGS

FIG. 5 is a diagram of operating conditions of the link cam and of the DC motor over time.

DETAILED DESCRIPTION OF THE PREFERRED EMBODIMENTS

Figure 1:
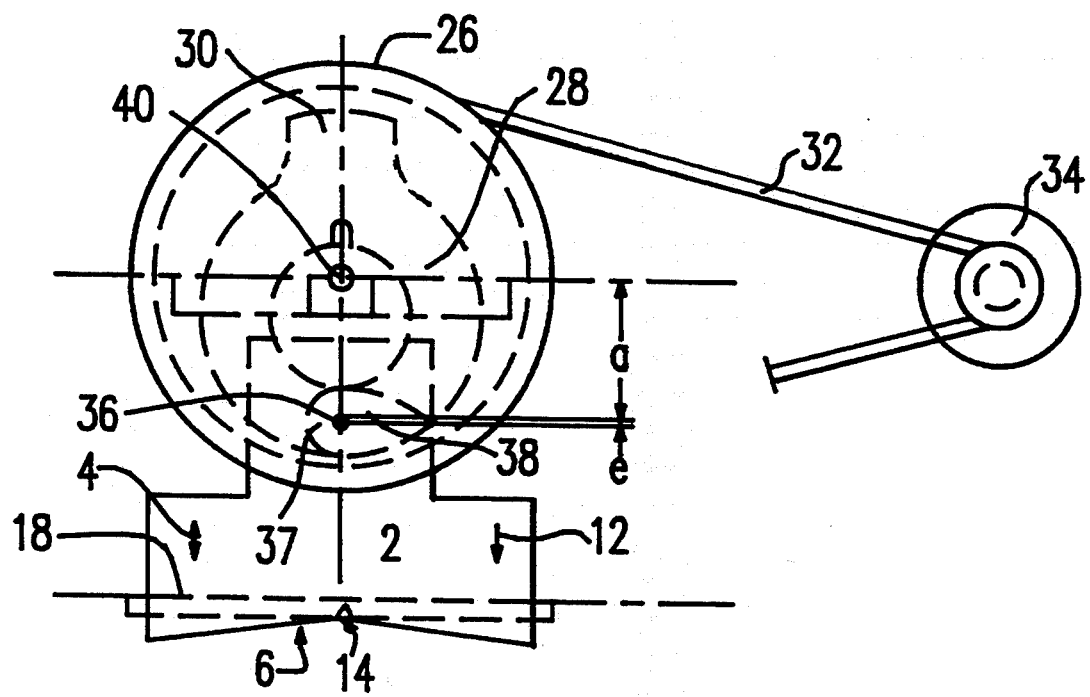
FIG. 1 is an elevational view of a cutter means of a printer having a disk cam fashioned as a link cam.
Figure 2:
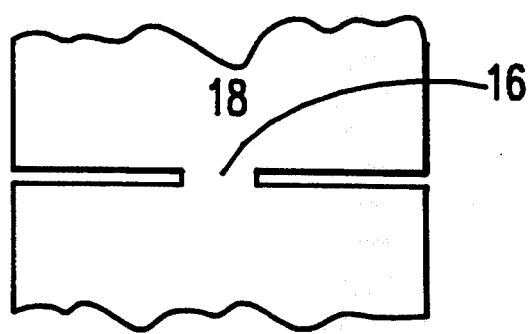
FIG. 2 is a plan view of a paper strip cut by the cutter means.

FIG. 1 shows a cutter means of a cash register printer according to the invention. Only those features of the cutter means necessary for an understanding of the present invention shall be set forth below. Further technical explanations may be derived from EP 0 191 907/B1, corresponding to U.S. Pat. No. 4,651,609 herein incorporated by reference. The cutter means has a blade 2 that has the shape of an inverted T. It is seated displaceable in the direction of the double arrow 4. A cutter 6 of the blade 2 has a central recess 14. The width thereof corresponds through the width of a web 16 (see FIG. 2) of a paper web 18 when a partial cut ensues as shall be set forth later.

A link cam 26 serves the purpose of driving the blade 2 in the direction of the double arrow 4. It has a slideway 28 which has a broadened portion 30 that extends outwardly in a radial direction. The link cam 26 is connected to a DC motor 34 via a drive belt 32.

A link block 38, which has the approximate shape of a drop and is rotatably secured to the upper side of the blade 2 via a shaft 36, engages into the slideway 28. The slideway 28 is eccentrically arranged relative to the rotational axis 40 of the link cam 26. Given a 360° rotation of the link cam 26, the link block 28 and, thus, the blade 2 execute a motion in the direction of the double arrow 4.

The shaft 36 of the link block 38 is laterally offset out of the center in its breadth direction by the amount e. This results in the fact that the stroke of the blade 2 amounts to a+e in the one instance and a−e in another instance in its lowest position shown in FIG. 1, dependent on whether the head of the link block 38 in FIG. 1 points toward the left or, respectively, toward the right, whereby a is the distance of the rotational axis 40 from the center line of the slideway 28.

In the initial position, the broadened portion 30 is located in a lower position, i.e., is turned by 180° in comparison to the position shown in FIG. 1. The link block 38 is then located within the broadened portion 30. The link cam 26 is designed such that the link block 38 respectively enters head-first into the slideway 28 both given a clockwise rotation as well as given a counter-clockwise rotation. Given a clockwise rotation of the link cam 26 out of the initial position, consequently, the blade 2 has a maximum space a+e from the rotational axis 40 in its lowest position shown in FIG. 1 and, given a counter-clockwise rotation, has a maximum spacing of a—e. The different strokes serve the purpose of either entirely or only partially cutting the paper strip 18 in FIG. 2. Such a cutter means is employed, for example, in cash register printers for cutting a register receipt.

Figure 3:
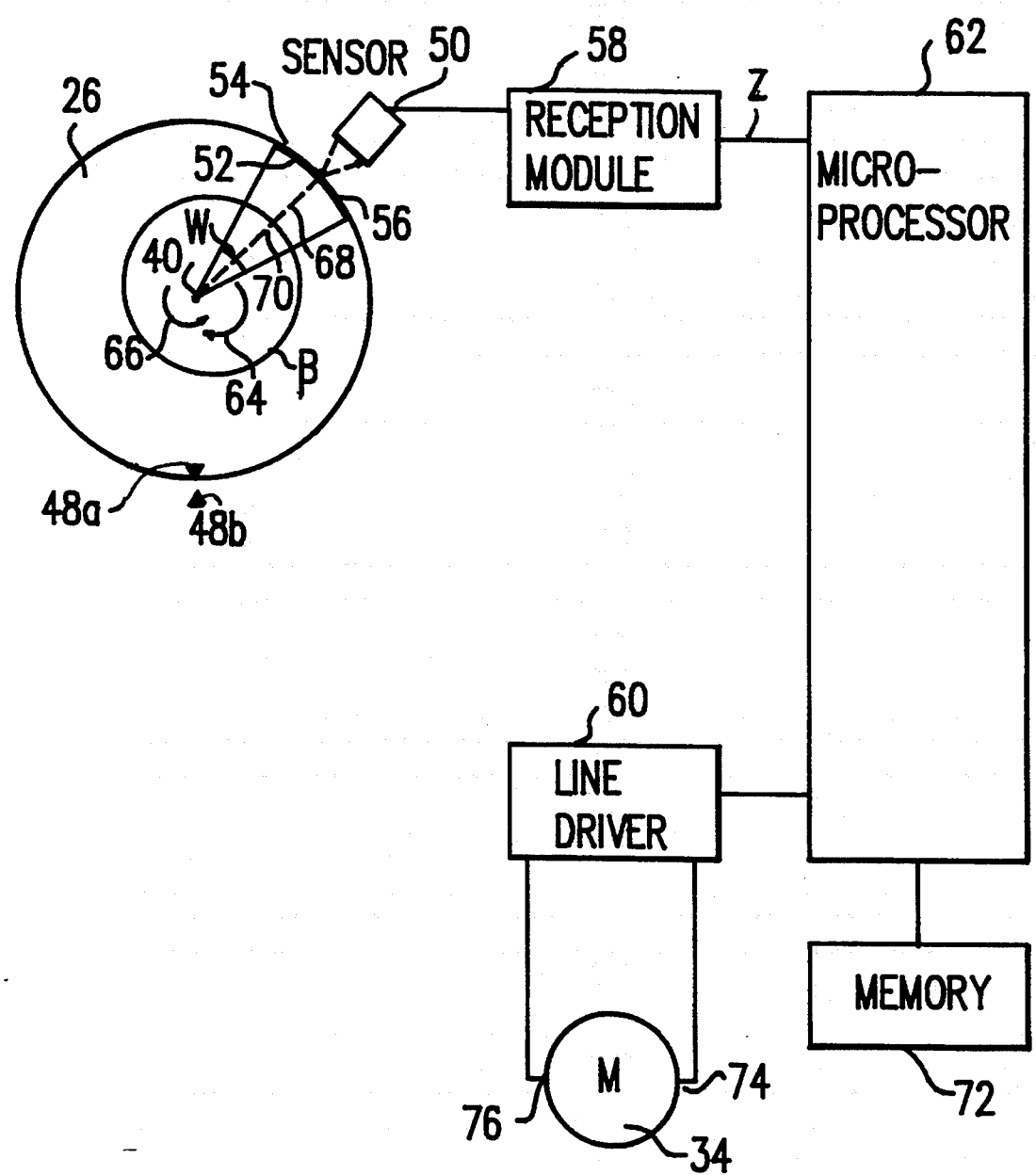
FIG. 3 is a schematic view of the disk cam having a marked zone, a reflex sensor, a DC motor and electronic control units.

FIG. 3 shows the link cam 26 together with further components. The zone 52 marked along the circumference of the link cam 26 and having enhanced reflectivity in comparison to the adjoining zones defines a target sector 70. The light/dark transitions at the end sections of the zone 52 form markings 54, 56. In this embodiment, the angular spacing of the markings 54, 56 can range from 1° through 45° and preferably from 3° through 5°. For cutting, the link cam 26 moves out of its initial position indicated with the marks 48a and 48b by a full revolution in one of the two rotational directions indicated by arrows 64, 66. The mark 48a thereby turns relative to the stationary mark 48b together with the link cam 26. The reflex sensor 50 is stationarily arranged outside of the link cam 26. In the initial position of the link cam 26, wherein the marks 48a and 48b reside opposite one another, the reflex sensor 50 has an angular spacing from the angle bisector 68 of the target sector 70 that is equal to a rotational angle $\beta$ by which the link cam 26 is to be controlled. Since the rotational angle $\beta$ amounts to 360° in the embodiment, the reflex sensor 50 is located within the target sector 70 and respectively resides opposite the angle bisector 68 both in the initial position as well as after the target position has been reached.

The reflex sensor 50 has a radiation transmitter (not shown) that emits radiation onto the circumferential region of the link cam 26 wherein the marked zone 52 is located. The reflected radiation is acquired by a radiation receiver (not shown) contained in the reflex sensor 50 and is converted into an electrical signal. The latter is evaluated by a reception module 58 that generates a zone signal having two statuses that indicate whether the reflex sensor 50 resides opposite the marked zone 52 or not. The zone signal respectively changes in status at the light/dark transition or, respectively, at the dark/light transition of the zone 52, i.e., at the markings 54 or, respectively, 56. The zone signal is supplied to a microprocessor 62 for further processing. The microprocessor 62 controls a line driver 60 that supplies a DC motor 34 with direct current or that can short-circuit this motor at its terminal posts 74, 76. The microprocessor 62 also accesses a memory 72 wherein the program for controlling the individual sequence steps as well as parameters are stored, these being recalled for controlling the DC motor 34, as shall be set forth later.

Figure 4A:
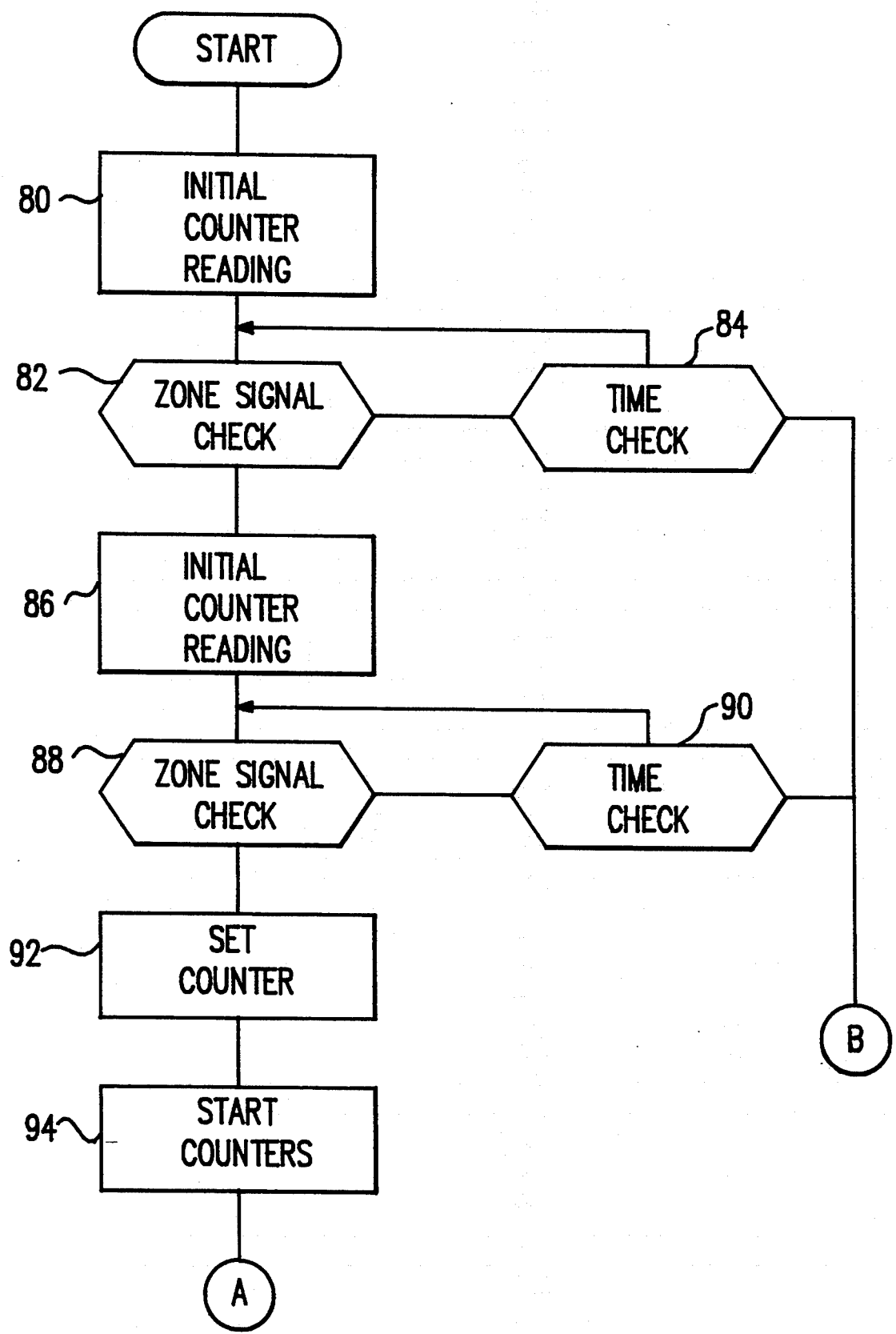
FIGS. 4a and 4b are flow charts of the method for adjusting the link cam.
Figure 4B:
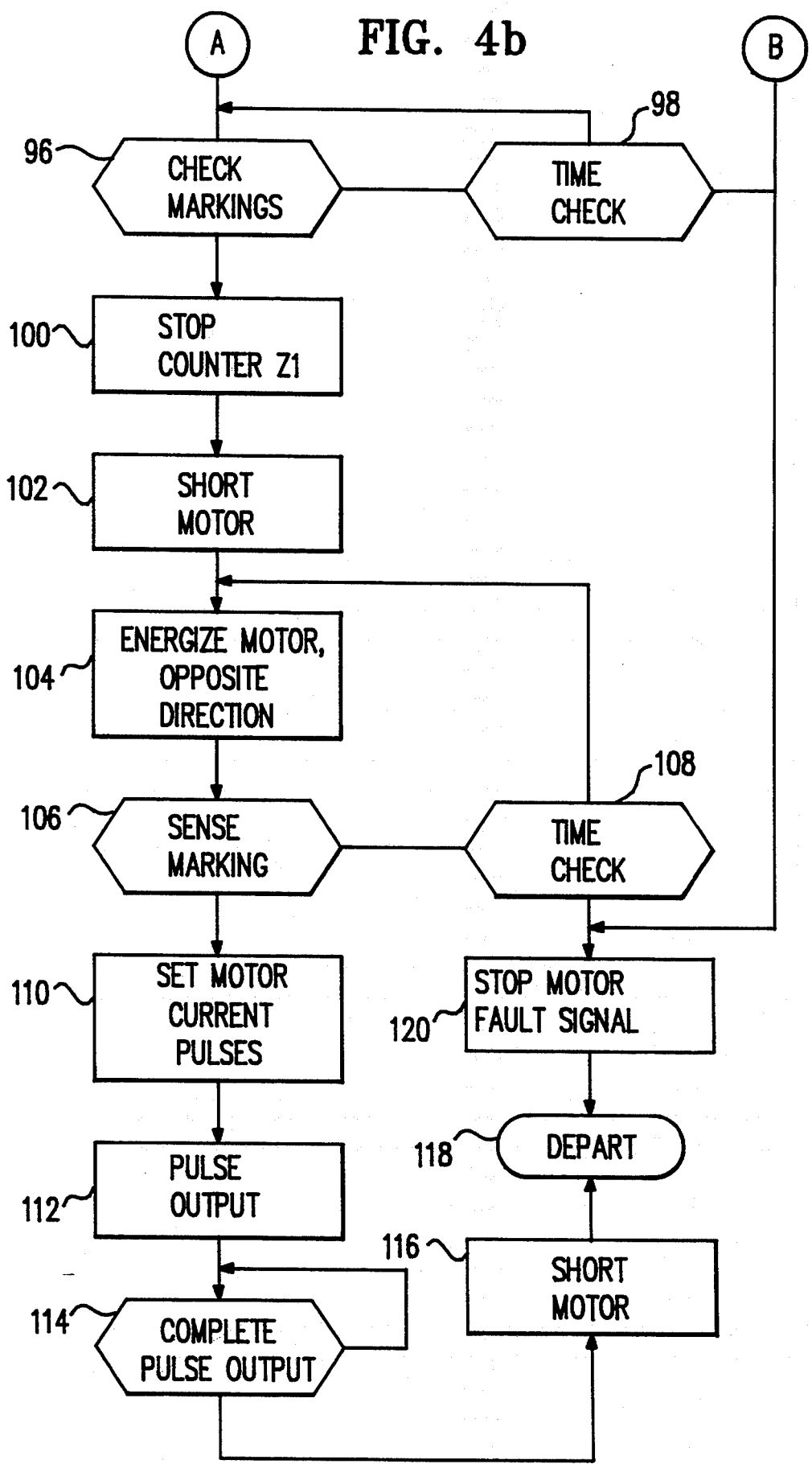

FIGS. 4a and 4b show a flow chart that reproduces the individual method steps for adjusting the link cam 26 by one full revolution. The individual method steps are implemented according to a program contained in the microprocessor 62. For evaluating time conditions, two counters Z1, Z2 are provided by software in the microprocessor 62, these counters Z1, Z2 counting the clock pulses having a constant period duration. The counter Z1 serves the purpose of identifying the running time of the running of the markings 54, 56 past the reflex sensor 50, i.e., the zone 52. The counter Z2 serves the purpose of monitoring motion sequences. When these motion sequences are not concluded within a time defined by the initial condition of the counter Z2, then a fault signal is generated.

After the start of the execution program, the counter Z2 is loaded to an initial counter reading in method step 80 according to FIG. 4a; the deincrementation of the counter Z2 is subsequently started dependent on the clock pulses of the microprocessor 62; and the DC motor 34 is supplied with current. In method step 82, a check is carried out with reference to the zone signal to see whether the zone 52 has been moved out of the range of acquisition of the reflex sensor 50. When this is not the case, a check is carried out in method step 84 to see whether the time prescribed by the counter Z2 for this portion of the method has expired. When the time has expired, this indicating a malfunctioning drive system, a branch is made to method step 120 (FIG. 4b), wherein the DC motor 34 is arrested, a fault signal is generated and the sequence program is departed.

When the prescribed time has not yet expired, the method step 82 is repeated until a determination is made on the basis of the zone signal that the zone 52 is located outside the reflex sensor 50. Subsequently, one proceeds to method step 86 wherein the counter Z2 is again loaded to an initial counter reading for monitoring the next phase of the method and is started.

In the following method step 88, a check is carried out with reference to the zone signal to see whether the zone 52 has proceeded into the acquisition range of the reflex sensor 50 after the rotation of the link cam 26 by approximately 360°. The time monitoring with the counter Z2 is thereby again effective in method step 90. When the zone 52 is not reached within the prescribed time, then a branch to the above-described method step 120 is carried out and a fault is displayed.

When the zone signal signals that the reflex sensor 50 has acquired one of the markings 54, 56, then the counter Z1 is set to the value 0 in the following method step 92. Subsequently, both counters Z1, Z2 are started in method step 94, whereby the counter Z1 is incremented at every clock pulse and the counter Z2 is deincremented.

In the following method step 96, a check is carried out with the zone signal to see whether both markings 54, 56 have moved past the reflex sensor 50. This passage is monitored for time transgression in the way already set forth with the assistance of the counter Z2 in step 98. Given a positive result in step 96, the counter Z1 is stopped in the following method step 100. Its counter reading corresponds to the running time of the zone 52 past the reflex sensor 50.

In the following step 102, the line driver 60 is controlled such by the microprocessor 62 such that the DC motor 34 is shorted at its posts 74, 76 for a waiting time Tw, as a result whereof the DC motor 34 is decelerated and stopped. The waiting time Tw is set inversely proportional to the identified running time, i.e., inversely proportional to the counter reading of the counter Z1. It is dimensioned such that the DC motor 31 is sure to stop.

In method step 104, subsequently, the DC motor 34 is supplied with current pulses that turn it in the opposite direction with a slow speed. The current pulses are thereby continuously counted in a further counter Z3. A determination is made in step 106 as to whether the most recently sensed marking, which is the marking 54 or 56 dependent on the rotational direction, is acquired by the reflex sensor 50. This method phase is also monitored for time transgression in step 108 in the way set forth above.

When the marking 54 or, respectively, 56 has been acquired by the reflex sensor 50, the parameters of pulse packets with which the DC motor 34 is to be supplied in order to achieve its ultimate target precision are identified in the following step 110. The pulse packets are composed of current pulses having a constant current strength and duration. A first parameter P1 specified the number of current pulses per pulse packet; a second parameter P2 indicates the number of pulse packets to be output overall to the DC motor 34.

Figure 6:
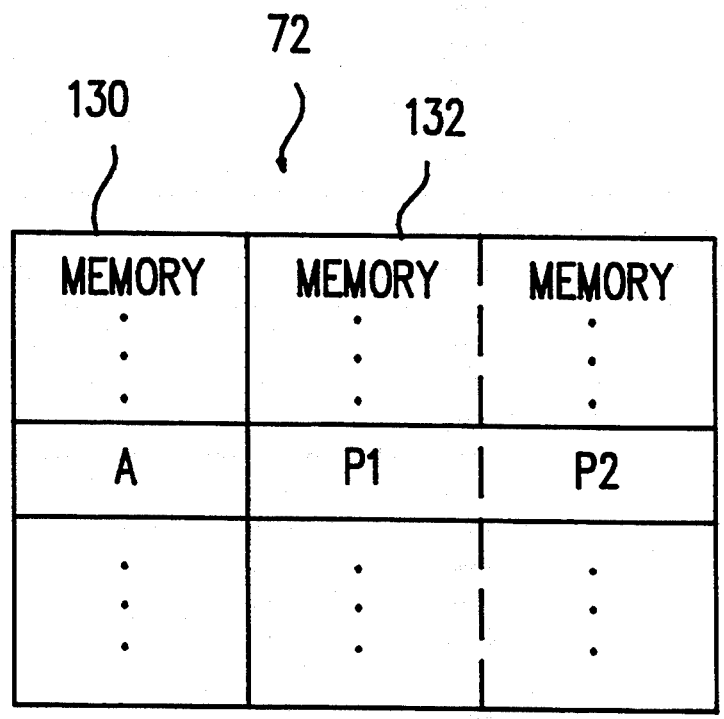
FIG. 6 is a block diagram of the structure of a parameter memory.

In order to offer suitable parameters P1, P2 for various operating conditions of the cutter means, these are deposited in table form in the memory 72 of the microprocessor 62. The structure of the memory 72 for storing the parameters P1, P2 is illustrated in FIG. 6. The access onto the parameters P1, P2 stored in a memory area 132 respectively ensues via a memory address A of a memory area 130, which is formed of the sum of the counter reading of the counter Z1 plus the number of current pulses output in method step 104, i.e., the current counter reading of the counter Z3. The empirically identified parameters P1, P2 of the pulse packets had been previously stored under the addresses A of the memory 132 formed in this way, these assuring an exact approach to the desired rotational position wherein the reflex sensor 50 resides opposite the angle bisector 68 of the target sector 70.

During the further method execution of FIG. 4b, the pulse packets identified in step 110 are output in prescribed, constant time spacings in method step 112. After the output of all pulse packets, this being monitored in method step 114, the DC motor 34 is shorted at its posts 74, 76, so that the DC motor 34 has a high holding moment. The DC motor 34 is then located in the desired rotational position that is offset by 360° relative to the initial position. Subsequently, the program of the microprocessor 62, this program controlling the method sequence, is departed in step 118.

Statuses of the link cam 26 and of the DC motor 34 over the time t are shown in four graphs in FIG. 5. The zone signal in two logical statuses 0 and 1 is shown in the upper part of FIG. 5. The status 0 thereby indicates that the reflex sensor 50 is located outside the markings 54, 56, i.e., the zone 52 is not covered. The status 1 indicates that the reflex sensor 50 resides opposite the zone 52.

The two middle graphs of FIG. 5 show characteristics of the current to be supplied to the DC motor 34 for rotation toward the right or, respectively, the left. The lower characteristic indicates the speed of the DC motor 34 on which the angular velocity of the link cam 26 is directly dependent.

The various statuses of the link cam 26 and of the DC motor 34 are explained below at times ta through ti. At time ta, current that places the motor into a right-hand (clockwise) rotation is continuously supplied to the DC motor 34. Consequently, the link cam 26 is also turned in the direction of the arrow 64 (FIG. 3). At time tb, the link cam 26 has turned to such an extent that the marking 54 passes the reflex sensor 50 and the zone signal changes to logical status 0.

At time tc, the reflex sensor 50 acquires the marking 56; the zone signal changes into status 1. At time td, the entire zone 52 has moved past the reflex sensor 50 and the marking 54 is acquired. The zone signal changes into the status 0. The chronological spacing T1 between the times tc and td is measured with the assistance of the counter Z1. The current for the right-hand rotation of the DC motor 34 is shut off at time td and its posts 74, 76 are shorted at time te. The DC motor 34 is thus operated as a current generator, is thereby decelerated and stands still at time tf.

The waiting time Tw wherein the short is effective has expired at time tg and the DC motor 34 is charged with current pulses 122 that slowly turn it in the opposite direction, i.e., toward the left (counterclockwise) in the direction of the arrow 66. At time th, the reflex sensor 50 acquires the marking 54; the zone signal assumes the status 1. Subsequently pulse packets 124 are output to the DC motor 34 that turn it further in the "left" (counterclockwise) rotational sense. After all pulse packets have been output, the DC motor 34 is short-circuit decelerated. At time ti, the link cam 26 has reached the desired position rotated by 360° relative to its initial position 48a, 48b.

The sensor 50 can be deactivated at ta for a period approximating the anticipated duration of the time T1 so that the sensor does not recognize a vibration of the disk cam during the time between the release of the brake (cancellation of the short) and the charging of the motor with current, as the passing of a marking. The time periods shown in FIG. 5 are not to scale, i.e., the interval between ta and tb is actually greater than T1.

It must also be noted that the invention is not limited to the rotational angle of $\beta=360°$ according to FIG. 3 but also covers arbitrary other rotational angles by which a disk cam is to be displaced out of a preselected initial position. To this end, it is advantageous to arrange the reflex sensor 50 at an angular spacing in the desired rotational sense relative to the initial position that is equal to the rotational angle and the above-described method steps are to be correspondingly applied. The initial position can thereby be defined by mechanical indentations, by a further sensor attached opposite the initial position of the disk cam, this sensing the markings 54, 56, and/or by further markings on the disk cam.

Although the present invention has been described with reference to a specific embodiment, those of skill in the art will recognize that changes may be made thereto without departing from the scope and spirit of the invention as set forth in the appended claims.

We claim as our invention:

1. A method for the adjustment of a disk cam, whereby an electric motor turns the disk cam out of a prescribed initial position by a prescribed rotational angle, comprising the steps of:
   providing a disk cam having two time markings in a prescribed angle from one another defining a target sector on the disk cam;
   providing a stationary sensor arranged outside the disk cam for sensing said two markings during rotational motion of the disk cam;
   with respect to an initial position of the disk cam, arranging the sensor at an angular spacing from a target radius of the target sector equal to the prescribed rotational angle;
   rotating the disk cam from the initial position and measuring a running time between successive sensing of the markings at the sensor; and
   arresting the motor in response to a sensing of a second marking passing by the sensor; and
   supplying the motor with electrical energy for turning it in the opposite rotational sense, the amount of this energy dependent on the respectively identified running time, being taken from an energy/running time characteristic, for the return of the disk cam to the initial position.

2. A method according to claim 1, wherein the prescribed rotational angle is 360°.

3. A method according to claim 1, wherein said step of providing a disk cam is further defined in that said markings are optical markings, and a zone of enhanced reflectivity is provided at the outer circumference of the disk cam, a light/dark transition and a dark/light transition to the respectively adjoining zones of the disk cam to the zone of enhanced reflectivity forming respective optical markings that can be sensed by said sensor.

4. A method according to claim 1, wherein said step of supplying the motor with electrical energy is further defined in that the motor is turned with an energy supply that is constant over time after being stopped, until a renewed sensing of the second marking.

5. A method according to claim 4, wherein said step of supplying the motor with electrical energy is further defined in that the energy that is supplied to the motor for rotation in the opposite direction until the renewed sensing of the most recently sensed marking is identified; and in that the amount of the energy still to be supplied to the motor increases with increasing energy.

6. A method according to claim 1, wherein said step of supplying the motor with electrical energy is further defined in that said motor comprises a DC motor.

7. A method according to claim 6, wherein said step of supplying the motor with electrical energy is further defined in that said electrical energy is supplied in the form of current pulses to the DC motor, at least after said motor is stopped.

8. A method according to claim 7, wherein said step of supplying the motor with electrical energy is further defined in that the current pulses have constant strength and duration and their plurality is dependent on the running time.

9. A method according to claim 7, wherein said step of supplying the motor with electrical energy is further defined in that the DC motor is initially supplied, after being stopped, with first current pulses with a prescribed duration and current strength, these turning the DC motor in the opposite direction until a renewed sensing of said second marking; and in that the DC motor is then supplied with second current pulses having a prescribed duration and current strength whose plurality is dependent on the running time and on the plurality of first current pulses.

10. A method according to claim 9, wherein said step of supplying the motor with electrical energy is further defined in that the second current pulses are combined to form pulse packets having a constant period duration, whereby the plurality of second current pulses per pulse packet and the plurality of pulse packets is calculated dependent on the running time and on the plurality of first current pulses.

11. A method according to claim 1, wherein said step of measuring a running time is further defined in that a counter is provided which counts clock pulses having a constant period duration during the passage of the markings passed the sensor; and said step of supplying the motor with electrical energy is further defined in that the amount of the energy supplied to the motor is dependent on the counter reading of the counter.

12. A method according to claim 9, wherein said step of measuring a running time is further defined in that a counter is provided which counts clock pulses having a constant period duration during the passage of the markings passed the sensor; and said step of supplying the motor with electrical energy is further defined in that the amount of the energy supplied to the motor is dependent on the counter reading of the counter; and wherein said step of supplying the motor with electrical energy is further defined in that a first numerical value which indicates the plurality of second current pulses per pulse packet as well as a second numerical value which indicates the total number of pulse packets with which the DC motor is supplied are allocated to a plurality of possible aggregate values composed of the respective plurality of first current pulse plus the respective final value of the counter; and in that the first and second numerical values are stored in a memory, wherein the first and the second numerical value are combined and deposited under one address that corresponds to the respective aggregate value.

13. A method according to claim 1, wherein the step of arresting the motor is further defined in that the motor is short-circuit decelerated.

14. A method according to claim 13, wherein the step of arresting the motor is further defined in that the motor is short-circuited for a waiting time before being turned in the opposite direction, said waiting time being shorter with increasing, calculated running time.

15. A method according to claim 1, wherein the step of rotating the disk cam from the initial position is further defined in that the sensor is deactivated at the beginning of the rotational motion for a prescribed time which is preferably at least equal to the anticipated running time.

16. A method according to claim 1, wherein the step of arranging the sensor is further defined in that the target radius is the angle bisector of the target sector.

17. A method according to claim 1, wherein the step of providing a disk cam is further defined in that the angular spacing of the markings from one another lies in a range from 1° through 45°.

18. A method according to claim 17, wherein said range is from 3° through 5°.

19. A method according to claim 1, wherein the step of supplying the motor with electrical energy is further defined in that the amount of energy that is taken from the energy/running time characteristic becomes greater with increasing running time.

* * * * *